United States Patent [19]

Singh

[11] 4,345,476

[45] Aug. 24, 1982

[54] DIFFERENTIAL PRESSURE TRANSDUCER WITH HIGH COMPLIANCE, CONSTANT STRESS CANTILEVER BEAM

[75] Inventor: Gurnam Singh, Riverside, Calif.

[73] Assignee: Bourns Instruments, Inc., Riverside, Calif.

[21] Appl. No.: 285,238

[22] Filed: Jul. 20, 1981

Related U.S. Application Data

[63] Continuation of Ser. No. 172,101, Jul. 25, 1980, abandoned.

[51] Int. Cl.$^3$ .............................................. G01L 9/00
[52] U.S. Cl. .......................................... 73/720; 338/4; 338/42
[58] Field of Search ................. 73/720, 721, 726, 727, 73/DIG. 4, 862.65; 338/4, 42

[56] References Cited

U.S. PATENT DOCUMENTS

| | | | |
|---|---|---|---|
| 3,161,844 | 12/1964 | Kabell | 338/2 |
| 3,303,451 | 2/1967 | Yuan | 338/4 |
| 3,343,420 | 9/1967 | Kondo et al. | 73/720 |
| 3,389,362 | 6/1968 | McLellan | 338/4 |
| 3,559,488 | 2/1971 | Weaver | 73/398 |
| 3,638,481 | 2/1972 | Wilmer | 73/727 |
| 3,712,143 | 1/1973 | Weaver et al. | 73/407 R |
| 3,780,588 | 12/1973 | Whitehead, Jr. et al. | 73/398 AR |
| 3,894,435 | 7/1975 | Shimada et al. | 73/721 |
| 4,034,610 | 7/1977 | Biddle et al. | 338/4 |
| 4,058,788 | 11/1977 | Andrews et al. | 338/42 |
| 4,135,408 | 1/1979 | Di Giovanni | 338/4 |
| 4,157,032 | 6/1979 | Schaberg | 338/4 |
| 4,161,887 | 7/1979 | Stone et al. | 73/706 |
| 4,172,338 | 10/1979 | Gabrielson | 73/721 |
| 4,203,327 | 5/0980 | Singh | 73/721 |
| 4,212,209 | 7/1980 | Newbold et al. | 73/721 |

FOREIGN PATENT DOCUMENTS

| | | |
|---|---|---|
| 1206255 | 9/1970 | United Kingdom . |
| 1481179 | 7/1977 | United Kingdom . |
| 1573934 | 8/1980 | United Kingdom . |

*Primary Examiner*—Donald O. Woodiel
*Attorney, Agent, or Firm*—Howard J. Klein; William G. Becker

[57] ABSTRACT

In a differential pressure transducer, of the type having a cantilever beam mechanically linked to a pressure-sensitive diaphragm, and piezoelectric strain gauges diffused into or bonded onto the beam, the beam has a relatively high compliance as compared with the diaphragm to facilitate operation in low pressure ranges and to increase the overall operating range of the unit. In addition, the beam is constructed so that the total bending energy is transmitted to the area of the strain gauges so as to achieve near-perfect operating efficiencies.

6 Claims, 3 Drawing Figures

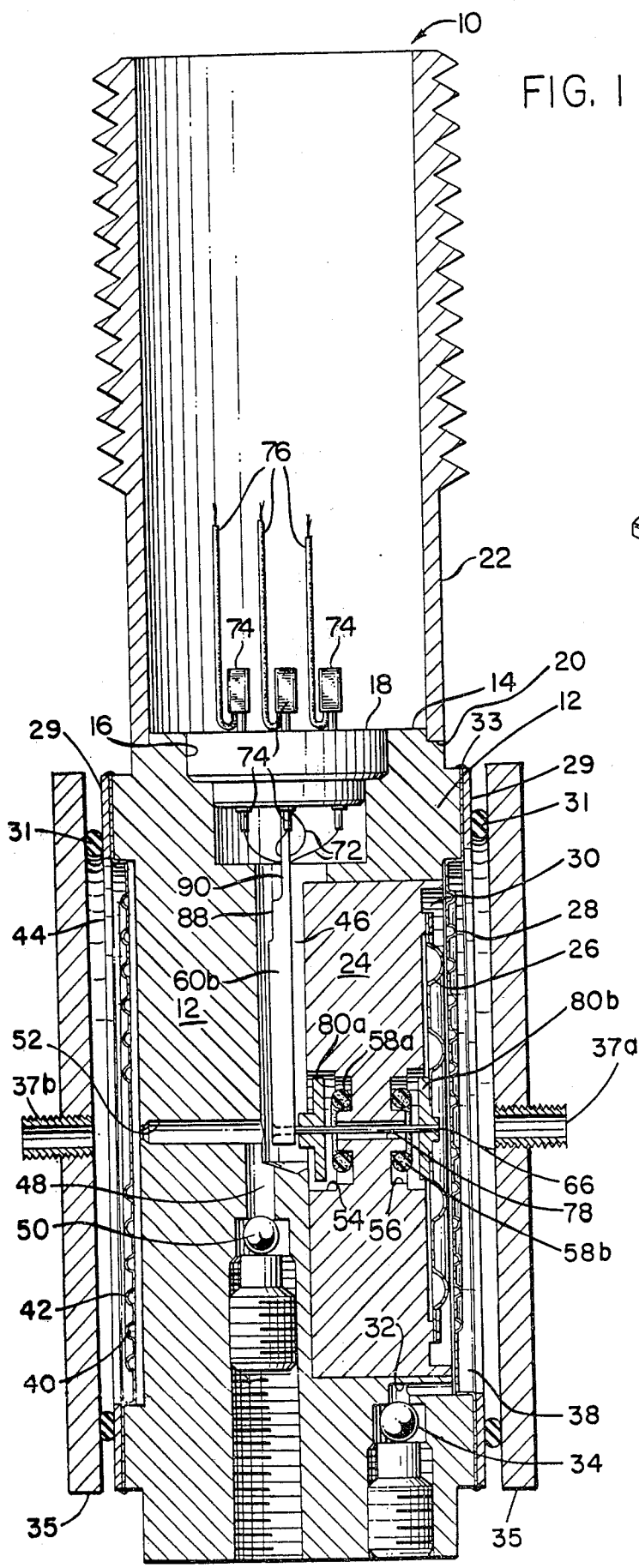

DIFFERENTIAL PRESSURE TRANSDUCER WITH HIGH COMPLIANCE, CONSTANT STRESS CANTILEVER BEAM

CROSS-REFERENCE TO RELATED APPLICATION

This application is a continuation of my co-pending application Ser. No. 172,101; filed July 25, 1980, now abandoned.

BACKGROUND OF THE INVENTION

1. Field of the Invention

The present invention relates to the field of differential pressure transducers, and, in particular, it relates to improvements in differential pressure transducers of the type employing piezoresistive strain gauge elements on a force-responsive cantilever beam.

2. Description of the Prior Art

Various differential pressure transducers are known in which a rigid rod or wire connects a pressure-sensitive diaphragm to a cantilever beam having piezoresistive strain gauges mounted thereon. Examples of such devices are disclosed in the following U.S. Pat. Nos.: 4,161,887 to Stone et al.; 4,203,327 to Singh; 4,058,788 to Andrews et al.; 3,559,488 to Weaver; 3,389,362 to McLellan; and 3,161,844 to Kabell.

In such devices, the motion of the diaphragm, in response to a pressure differential applied across it, is transmitted, via the rigid connecting link, to the beam, causing the latter member to flex. The strain gauges are typically electrically connected in a Wheatstone bridge configuration, such that the flexing of the beam causes a change in the output voltage of the bridge circuit due to the piezoresistive qualities of the strain gauges. This output voltage, finally, is fed into associated signal processing circuitry, well-known in the art, which provides a reading of the sensed differential pressure.

The typical prior art transducer, of the type described above, utilizes a beam which is relatively stiff, or non-compliant, as compared with the sensing diaphragm. The advantage of such a design is that the resulting small full scale deflection of the beam provides a relatively high signal-to-deflection ratio, so that adequate signal quality is achieved for relatively small beam deflections. While such a design is acceptable for measuring relatively high differential pressures, the low deflection-to-force ratio of such devices yields a low signal-to-force ratio which renders such devices less than optimal for low differential pressure ranges, i.e., on the order of 1 to 5 psi.

Moreover, in such prior art devices, a high degree of care must be taken to thermally match, as precisely as possible, all pressure-sensitive and pressure-responsive components and links, since ambient temperture effects which produce even a small beam deflection result in degraded signal accuracy. In short, such devices, without precise thermal matching of components, do not display a relatively high signal-to-noise ratio due to ambient temperature effects. The requirement for such thermal matching increases the cost of such prior art devices.

Furthermore, in order to protect such devices in overpressure situations, the components must be constructed to very close tolerances. Thus, for example, if overpressure stops are set at twice the full scale deflection, and the full scale deflection is small, the tolerances in the overpressure stop mechanism must be proportionately close to maintain the required overpressure function.

Finally, in prior art devices, using a stiff beam/compliant diaphragm combination, the measurable differential pressure range is determined by the physical characteristics (i.e., the stiffness) of the beam. Such devices are typically operative only over a relatively narrow pressure range. Therefore, different pressure ranges can be accommodated only by changing the beam to one with a different stiffness. This factor contributes to the expense and inconvenience of utilizing such devices in different pressure ranges, since the beam is usually the most expensive component, as well as the most difficult to replace. Thus, the usual approach is to have several transducers on hand, each designed for optimal operation in a different pressure range, where a wide variety of pressure ranges is expected.

Underlying the need for a low compliance (stiff) beam, in combination with a compliant diaphragm in the prior art devices, is the fact that the beam in such devices is structured so that the bending action of the beam, in response to the force on the diaphragm, is distributed throughout the length of the beam, and is not concentrated in the area containing the strain gauge elements. The result is a substantial loss in efficiency, up to about 50 percent. Thus, such devices display a relatively low signal-to-force ratio, necessitating a design in which diaphragm forces are accumulated, or collected, on the beam, in order to obtain an adequate strain gauge response. This criterion is achieved through use of a diaphragm which is highly compliant as compared with the beam. The beam, being relatively stiff, exhibits a high degree of strain for a given degree of deflection, so that the aforementioned high signal-to-deflection ratio is achieved. Thus, the prior art devices achieve adequate strain gauge response through a mechanism which depends upon low compliance beam, resulting in the nonoptimal low pressure range performance, along with the other limitations in the stiff beam design, mentioned above.

There is thus a need in the art for a differential pressure transducer which achieves adequate signal quality over a wide range of differential pressures, including very low differential pressures, and which achieves accuracy and overpressure tolerance.

Moreover, there is a need for a device which displays such capabilities in a design which lends itself to economies in production costs. Finally, there is a need for such a device which achieves near-perfect operational efficiencies.

SUMMARY OF THE INVENTION

The present invention utilizes a specially designed, high-compliance beam in combination with a relatively stiff sensing diaphragm to provide a differential pressure transducer which meets the aforementioned needs. Central to the invention is a cantilever beam having a constant stress configuration, whereby the bending of the beam is concentrated in the area of the strain gauge sensors bonded thereon or diffused therein. This configuration thus allows near-perfect operational efficiencies in that substantially all of the force transmitted to the beam from the diaphragm is converted into a strain which, in turn, is converted into an electrical signal by the strain gauges. Thus, the beam provides a high signal-to-force ratio, which, in turn, allows the use of a high compliance beam in conjunction with a low compliance diaphragm.

The advantages of a high compliance beam are manifold. First, and perhaps most importantly, as a result of the high compliance of the beam, it is responsive to very low forces transmitted to it from the pressure sensing diaphragm 26 through the strut wire 66. Thus, the beam is responsive to low differential pressures, provided that a sufficiently sensitive (i.e., compliant) diaphragm is used.

Secondly, because a high compliance beam is capable of a greater full scale deflection than is a rigid, or low compliance beam without exceeding the optimal stress limits of the material, it is capable of a lower signal-to-deflection ratio. Thus, it is less sensitive to errors from transient causes, such as, for example changes in ambient temperature. In this regard, it will be appreciated that deflections due to ambient temperature changes will represent a relatively small proportion of the full scale deflection, thereby ensuring a high signal-to-noise ratio under such circumstances.

Similarly, tolerances in the overpressure stop mechanism become less critical with a beam having a large full-scale deflection. Thus, in overpressure situations, the stresses generated in the beam are well within the elastic limits of the beam. Therefore, overpressure stops can easily be set at, for example, twice the nominal full-scale deflection to allow for normal manufacturing tolerances while maintaining stress in the beam to well within the beam's elastic limits. The need, therefore, for custom machining the components to precise tolerances to severely limit maximum beam deflection is eliminated, thereby lowering the cost of manufacture.

Finally, the use of a high compliance beam allows a far greater operating range for the beam. The operating range of the transducer is thus limited by the stiffness (compliance) of the sensing diaphragm. Therefore, where the transducer is to be used in different pressure ranges, only the diaphragm need be changed, higher pressure ranges being accommodated by changing to a lower compliance (stiffer) diaphragm. This is advantageous because the diaphragm is a relatively inexpensive component, and is more conveniently replaced than is the beam.

BRIEF DESCRIPTION OF THE DRAWINGS

FIG. 1 is a schematic cross-sectional view of a differential pressure transducer constructed in accordance with the present invention;

FIG. 2 is a detailed perspective view of the preferred embodiment of the cantilever beam used in the present invention; and FIG. 3 is a detailed perspective view of an alternative embodiment of the cantilever beam used in the present invention.

DETAILED DESCRIPTION OF THE INVENTION

Referring first to FIG. 1, a differential pressure transducer 10 is shown in cross-section. The transducer 10 has a body 12 preferably of 17-4 or 17-7 stainless steel which is generally circular when viewed from the sides. The top of the body 12 has a flat, upper surface 14 having a stepped orifice 16 into which is fitted a header 18, which will be later described in greater detail. Attached to the body at a shoulder 20 surrounding the flat surface 14 is a cylindrical threaded tube 22.

Seated in a recess in one side of the body 12 is a sensing cell 24 onto which a circular corrugated sensing diaphragm 26 is mounted. A first isolator diaphragm 28 in combination with a spacer ring 29 (shown in cross-section in FIG. 1) is welded to the body 12 external to the sensing diaphragm 26 to form a first fill chamber 30 between the first isolator diaphragm 28 and the sensing diaphragm 26. The combined welding of the isolator diaphragm 28 and spacer ring 29 to the body 12 forms a peripheral weld 33 which is external to an O-ring 31. This O-ring 31, in combination with a pressure port plate 35, forms one input pressure port or chamber 37 of this transducer.

The function of the isolator diaphragm 28, in combination with the O-ring 31 and pressure port plate 35, is to form a non-corrosive barrier between the sensing cell 24 and the fluid of which the pressure is to be measured by this pressure transducer. The construction of this noncorrosive barrier differs from the typical prior art construction wherein the isolator diaphragm weld to the sensor body, is internal to the O-ring. Such prior art construction requires an additional back plate, or the like, which must be of the same exotic material as the isolator diaphragm to make the weld noncorrosive. This additional back plate, or the like, in the prior art is an additional expense in such prior art construction. On the other hand, the construction of the present invention (isolator diaphragm and spacer ring weld external to the O-ring) does not require a back plate or the like.

This chamber 30 is filled with an incompressible liquid such as oil, through a filling port 32, which is sealed with a ball seal 34. Similarly, on the opposite side of the body 12, a second chamber 40 is formed between a second isolator diaphragm 42 and the inner side of the sensing diaphragm 26. This chamber 40 is also filled with the same incompressible liquid as the first chamber 30, and sealed with ball seal 50.

Input pressure chambers are realized by using two pressure port plates 35 in combination with 2 O-rings 31 and four bolts and nuts (not shown). These pressure plates 35 have suitable inputs. As the differential pressure is applied, via the input pressure ports 37a and 37b, the sensing diaphragm 26 drives the beam 60b because of the incompressible filled liquid coupling.

The input pressure ports 37 are used for putting a differential pressure (to be measured) across the transducer. Input pressure ports 37a and 37b are respectively located at the low and high pressure sides of the transducer.

The sensing cell 24 has a symmetrical pair of stepped recesses 54, 56, one on each side of the cell. Seated in the innermost portion of the stepped recess 54 is a first O-ring 58a, and in the stepped recess 56 is an O-ring 58b, the purpose of which O-rings will be described later on.

Central to the invention is a high compliance, constant stress, cantilever beam 60a (FIG. 2) or 60b (FIGS. 1 and 3), the preferred embodiment of which, illustrated in FIG. 2, will be first discussed.

Referring now to FIG. 2, the beam 60a is shown in two parts: a first portion 61, semicircular in cross-section, is cantilevered from the bottom of the header 18, and a second portion 62, rectangular in cross-section, is spaced from the first portion and is connected thereto by a silicon chip 64 which is bonded (as by epoxy) to the elements 61 and 62. For optimum thermal matching, the portions 61 and 62 are both preferably of the same alloy as the body 12, i.e., 17-4 or 17-7 stainless steel. Attached to the free end of the beam portion 62, and extending perpendicularly therefrom is a strut wire 66, advantageously formed of the same material as the sensor 24, again from considerations of thermal matching.

The silicon chip 64 comprises a high resistivity N-type substrate, having a thickness of approximately 12.5 mils. P-type resistive elements are diffused into the beam to provide piezoresistive strain gauges 68. The strain gauges 68 are advantageously arranged to provide a pair of full bridge circuits on the same side of the chip 64. This can be accomplished if the P-type strain gauge elements 68 are diffused along the <110> <1$\overline{1}$0> directions onto a wafer in the <100> plane, and the wafer is sliced so that the chip 64 can be oriented, when bonded to the beam portions 61 and 62, with the strain gauges disposed longitudinally and transversely.

The bridge circuits formed by the strain gauges 68 are provided with metallized contact pads 70 for connection, by wires 72, to the bottom portions of terminals 74, which extend through the header 18. Wires 76 are attached to the other end of the terminals 74, these wires extending through the tube 22 and into appropriate connectors (not shown) in the signal processing circuitry.

As shown in FIG. 1, the strut wire 66 passes through a strut wire journal 78 in the sensing cell 24, and has its end attached to the center of the sensing diaphragm 26. Mounted on the strut wire 66 are first and second overpressure stops 80a and 80b, which bear against the O-ring seals 58a and 58b, respectively, to prevent overstress of the beam in overpressure situations respectively involving overpressures from the left and from the right sides as shown in FIG. 1.

Referring again to the specific beam shown in FIG. 2, the beam 60a may advantageously be selected to have a nominal operating strain of 340 micro-inches per inch, and a nominal full-scale deflection of 6.5 mils. This yields a signal-to-deflection ratio of approximately 52 micro-inches per inch per mil, which is quite low, indicating a relatively high compliance compared with prior art beams. This high compliance is a result, at least in substantial part, of the reduced thickness of the silicon chip 64 as compared with the rest of the beam. In the given example (which is for illustrative purposes only), the chip 64 is about 12.5 mils thick, while the beam elements 61 and 62 have a thickness of approximately 65 mils.

This reduced thickness of the chip as compared with the beam is important from another aspect. Because the length of the chip is relatively small in comparison with the entire length of the moment arm (typically less than 25%), and because nearly all of the bending of the beam occurs in the area of the chip (due to its greatly reduced thickness), the stress throughout the area of the strain gauges does not vary greatly, and, in fact can be considered approximately constant throughout this area, which thus develops substantially all of the stress developed by the beam. Because the stress is concentrated in the area of the sensing elements, the beam displays a relatively high signal-to-force ratio, i.e., on the order of about 16. Thus, for example, full-scale deflection, which yields a stress (or signal) of 340 micro-inches per inch, is achieved with an applied force of approximately 21 gm, thereby yielding the aforementioned ratio of 16. This high operational efficiency (which can be considered near-perfect in the sense that nearly all of the applied force is converted into a stress on the strain gauges) enables the achievement of adequate signal levels despite the low signal-to-deflection ratio (high compliance).

Because the beam is highly compliant, proper selection of the sensing diaphragm can result in a transducer that yields acceptable results even at very low differential pressures, i.e., on the order of 1 psi or lower. The principal criterion for selecting the proper diaphragm is the ratio of diaphragm stiffness to beam stiffness (stiffness being the opposite, or inverse, of compliance for our purposes).

Every diaphragm has a "shape factor" $\alpha$ which is defined by the particular corrugation geometry of the diaphragm. Specifically, $\alpha$ may be defined as follows:

$$\alpha = \sqrt{K_1 K_2} \text{ , where}$$

$K_1$ is the ratio of the distance, along the diaphragm's surface between corresponding points of two successive corrugations (e.g., peak-to-peak) to the wavelength of the corrugation (the straight line distance between the corresponding points of two successive corrugations); and $K_2$ is the ratio of the moment of inertia of a strip taken along a radius of the corrugated diaphragm, to the moment of inertia of a flat strip having the same thickness and length as the corrugated strip.

It will be appreciated from the foregoing definition of the shape factor $\alpha$ that both $K_1$ and $K_2$ will equal 1 for a flat (uncorrugated) diaphragm. Thus, for such a diaphragm, $\alpha$ will equal 1, while a corrugated diaphragm will have an $\alpha$ which is greater than 1, the particular value being defined by the geometry of the corrugations. For typical diaphragms used in differential pressure transducers of the type disclosed herein, $\alpha$ values usually range between about 5 and about 30.

For such diaphragms, the total force generated by an applied pressure (the "collected force") is given by the formula:

$$F_c = \pi R^2 P; \tag{1}$$

where $F_c$ is the collected force, R is the diaphragm radius (assuming a circular diaphragm), and P is the pressure applied to the diaphragm. In order to get an adequate signal from the transducer, the collected force must be converted to a force applied to the beam ("applied force"). The applied force $F_a$ can be expressed as a fraction of the collected force thusly:

$$F_a = F_c/\omega; \tag{2}$$

where $\omega$ is a number equal to or greater than 1. Solving for $\omega$ we get:

$$\omega = F_c/F_a. \tag{3}$$

It has been determined empirically by the inventor herein that for diaphragms having values of alpha of about 6 and above, the value of $\omega$ is no greater than 2.6. This means that for such diaphragms, 2.6 units of collected force of the diaphragm produces at least one unit of applied force on the beam (the force on the diaphragm being transmitted to the beam via the strut wire 66, which is connected to the center of the sensing diaphragm 28, as previously described).

It can be shown that for small diaphragm deflections, the amount of deflection is roughly proportional to the collected force and roughly inversely proportional to the stiffness of the diaphragm. Therefore, since the force applied to the beam is about 0.38 times the collected force, in order for the beam to undergo full-scale deflection for a given collected force, the beam must have a stiffness no more than about 0.38 times the stiffness of the diaphragm. Conversely, the beam must have a compliance of at least about 2.6 times that of the diaphragm.

Using the above described relationship between beam compliance and diaphragm compliance, full-scale beam deflection can be achieved with differential pressures as low as 1.0 psi with the beam constructed as previously described. Thus, the high compliance beam will have a compliance at least about 2.6 times greater than the relatively high compliance sensing diaphragm used to measure such low differential pressures. If higher pressure ranges are to be measured, stiffer diaphragms are substituted, so that the compliance factor is necessarily increased about the minimum of 2.6. In this manner, a range of differential pressures of 1.0 to 60 psi can be accommodated by proper substitution of diaphragms.

It will, of course, be appreciated that, especially where low differential pressures are measured, the isolator diaphragms 28 and 42 must have negligible stiffness as compared with the sensing diaphragm 26.

FIG. 3 illustrates in detail an alternate embodiment of the beam, namely, the beam 60b shown in conjunction with the transducer in FIG. 1. This beam 60b is a one-piece metal element, preferably 17-4 or 17-7 stainless steel (17% chrome, 4%-7% nickel, precipitation hardenable), and is cantilevered at one end with the header 18. The free end of the beam 60b carries a strut wire 66, as in the previously described preferred embodiment.

The portion of the beam 60b near the header 18 is relatively thin and is comprised of a shallow depression 88 and a flat reduced thickness area 90. The area 90, which constitutes no more than about one-third the total length of the beam, should have no more than one-third the thickness of the rest of the beam. By way of specific example, if the body of the beam, which has a semi-circular cross-section, has a maximum thickness of about 65 mils, the reduced thickness area 90 should preferably be no more than about 21 mils thick.

Bonded onto the beam at the reduced thickness area 90 are two pairs of piezoelectric strain gauges 82, one pair on each side. (Only one pair of strain gauges 82 are shown for the sake of clarity.) The strain gauge pairs on each side of the beam are each wired in a half-bridge configuration, as is well known in the art. The strain gauges 82 are provided with metallized contact pads 84 for connection of the wires 72 which lead to the terminals 74. A termination pad 86 is situated in the depression 88 on one side of the beam, and another termination pad (not shown) is located on the opposite side of the beam from the pad 86.

With the configuration described above, a beam can be constructed which will have, for example, a full-scale deflection of 6.5 mils with a strain of 350 micro-inches per inch, yielding a signal-to-deflection ratio of approximately 53 micro-inches per inch per mil. Full-scale deflection can be achieved with a force of 70 grams (56 gram inches), yielding a signal-to-force ratio of 5.

As with the beam 60a of FIG. 2, substantially all of the stress due to the bending of the beam 60a is concentrated in the reduced thickness area 90. Thus, the reduced thickness area 90 of the beam 60b, like the reduced thickness chip 64 of the beam 60a, provides the beam with a high compliance, while also allowing adequate signal levels to be achieved even with a relatively low signal-to-deflection ratio due to the concentration of the deflection stress in the area of the strain gauge sensors, thereby yielding a relatively high signal-to-force ratio. Moreover, since the reduced thickness area is short in length relative to the total length of the beam, and since the strain gauges typically occupy only about one-third to one-half of the length of the reduced thickness area, the measured stress does not vary greatly along the length of the strain gauges, and thus may be approximated as a constant along the total length of the strain gauges, thereby enhancing the efficiency and accuracy of the transducer.

The metal beam 60b can be incorporated in a transducer, as described above, in which the sensing diaphragm 26 has a shape factor of at least about 6, and a stiffness of at least 2.6 times as great as the beam, to achieve the advantages previously discussed. Thus, the specific example described above can be made with a beam stiffness as low as about 23.7 lbs. per inch. Therefore, to achieve suitable operability over a wide range of differential pressures (down to as low as about 1 psi), the diaphragm should have a stiffness of at least 61.6 lbs. per inch. Again, as stiffer diaphragms are used to accommodate higher pressure ranges, the beam-to-diaphragm compliance ratio will necessarily increase beyond the minimum value of 2.6.

Thus, there has been described a differential pressure transducer wherein the cantilever beam is constructed to achieve suitable signal levels while exhibiting a relatively high compliance. This high compliance, in turn, allows the transducer to accommodate a variety of pressure ranges, down to as low as 1.0 psi or lower, by the simple expedient of changing the sensing diaphragm (provided, of course, that the diaphragm has a shape factor of at least about 6, and a stiffness at least about 2.6 times the stiffness of the beam, an easily achieved criterion given that the beam is highly compliant).

Moreover, with the high compliance beam, with its large full-scale deflection, the transducer is less susceptible to inaccuracies due to ambient temperature variations, as discussed in the summary above, than are stiff beam transducers. Likewise, as previously discussed, the tolerances required in machining the overpressure stop mechanism components become less critical, as previously discussed, leading to economies in manufacture.

What is claimed and desired to be secured by Letters Patent of the United States is:

1. A differential pressure transducer, of the type employing a cantilever beam having piezoelectric strain gauges mounted thereon or diffused therein, a pressure-sensitive diaphragm, and a strut element connecting said diaphragm and said beam in a manner which produces a stress in said beam at said strain gauges in response to a pressure applied to said diaphragm, wherein the improvement comprises:

said diaphragm having a shape factor of at least about 6; and said beam having a compliance at least about 2.6 times the compliance of said diaphragm.

2. The differential pressure transducer of claim 1, wherein said beam has a configuration such that substantially all of the stress produced in said beam is produced in the area of said strain gauges.

3. The differential pressure transducer of claim 1, wherein said strain gauges are located in a reduced thickness area of said beam, said reduced thickness area having a relatively short length in proportion to the total length of said beam.

4. The differential pressure transducer of claim 3, wherein said total length of said beam is at least about 3 times the length of said reduced thickness area.

5. The differential pressure transducer of claim 1, further comprising:
   an isolator diaphragm external to said pressure-sensitive diaphragm and adapted to isolate said pressure-sensitive diaphragm from external media, said isolator diaphragm having negligible stiffness as compared with said pressure-sensitive diaphragm.

6. The differential pressure transducer of claim 5, further including on each side of said transducer:
   an O-ring; and
   a pressure plate which in combination with said isolator diaphragm and said O-ring forms an input pressure chamber on one side of said transducer, said isolator diaphragm being welded to said one side of said transducer at a position external to the position of said O-ring.

* * * * *